US010397733B2

(12) United States Patent
Srinivasan et al.

(10) Patent No.: US 10,397,733 B2
(45) Date of Patent: Aug. 27, 2019

(54) SHARING OF ENVIRONMENTAL DATA FOR CLIENT DEVICE USAGE

(71) Applicant: Intel Corporation, Santa Clara, CA (US)

(72) Inventors: Vasudevan Srinivasan, Hillsboro, OR (US); Barnes Cooper, Tigard, OR (US); Tawfik M Rahal-Arabi, Tigard, OR (US)

(73) Assignee: INTEL CORPORATION, Santa Clara, CA (US)

( * ) Notice: Subject to any disclaimer, the term of this patent is extended or adjusted under 35 U.S.C. 154(b) by 10 days.

(21) Appl. No.: 15/283,348

(22) Filed: Oct. 1, 2016

(65) Prior Publication Data

US 2018/0098191 A1 Apr. 5, 2018

(51) Int. Cl.
*H04W 4/38* (2018.01)
*H04W 4/80* (2018.01)
*H04W 4/021* (2018.01)
*H04L 12/26* (2006.01)
*H04W 4/70* (2018.01)

(52) U.S. Cl.
CPC ............ *H04W 4/021* (2013.01); *H04W 4/38* (2018.02); *H04L 43/16* (2013.01); *H04W 4/70* (2018.02); *H04W 4/80* (2018.02)

(58) Field of Classification Search
CPC .......... H04L 43/00; H04L 43/16; H04W 4/38; H04W 4/80
See application file for complete search history.

(56) References Cited

U.S. PATENT DOCUMENTS

| 6,748,195 | B1 | 6/2004 | Phillips |
| 2012/0215851 | A1* | 8/2012 | Wu ...................... H04L 67/104 709/205 |
| 2015/0195099 | A1 | 7/2015 | Imes et al. |
| 2016/0092617 | A1 | 3/2016 | Lee et al. |
| 2016/0266628 | A1 | 9/2016 | Jain et al. |
| 2016/0266629 | A1* | 9/2016 | Merrikh .................... G06F 1/28 |
| 2016/0349127 | A1* | 12/2016 | Britt ........................ H04W 4/06 |
| 2016/0366858 | A1* | 12/2016 | Seltzer ................. A01K 27/009 |
| 2017/0262030 | A1* | 9/2017 | Lee ........................... G06F 1/26 |

FOREIGN PATENT DOCUMENTS

KR 10-2010-0136829 12/2010

OTHER PUBLICATIONS

PCT Notification of International Preliminary Report on Patentability and Written Opinion of the International Searching Authority for International Application No. PCT/US2017/047187, dated Feb. 1, 2018, 15 pages.

* cited by examiner

*Primary Examiner* — Jinsong Hu
*Assistant Examiner* — Farideh Madani
(74) *Attorney, Agent, or Firm* — Womble Bond Dickinson (US) LLP

(57) ABSTRACT

Embodiments are generally directed to sharing of environmental data for client device usage. An embodiment of a client device includes a processor; an environmental sensor to sense an environmental condition, an output of the sensor being a local environmental sensor value; and a wireless receiver to receive environmental data for a certain proximity area from a second client device according to an environmental data sharing protocol via a wireless network. The environmental data sharing protocol allows receipt of the environmental data without requiring pairing, bonding, or other relationship of client devices.

14 Claims, 5 Drawing Sheets

SHARING OF ENVIRONMENTAL DATA FOR CLIENT DEVICE USAGE

TECHNICAL FIELD

Embodiments described herein generally relate to the field of electronic devices and, more particularly, sharing of environmental data for client device usage.

BACKGROUND

Modern client computing systems have become increasingly thinner in form factor, and further are provided in a variety of constrained form factors. At the time, the power and performance of these computing systems, including smartphones, tablets, Ultrabooks™, 2-in-1 systems, and other systems, are increasing many fold. As a result, such computing systems face conditions including system level and chassis level thermal issues very frequently.

To accommodate these thermal issues, client computing systems employ intelligent thermal and power management algorithms to mitigate the thermal issues by monitoring the chassis/skin temperatures either directly or indirectly (using a proxy sensor or virtual sensor), and take mitigation actions based on these temperature sensors and OEM defined thresholds for these sensors.

However, a significant problem in defining the target threshold temperatures for these sensors is that the detected temperatures are greatly impacted by the environment in which the client computing device is used. One key environmental factor is the ambient temperature of the environment the computing device is utilized within, which may vary widely for a mobile device that is utilized in many different locations for many different purposes.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
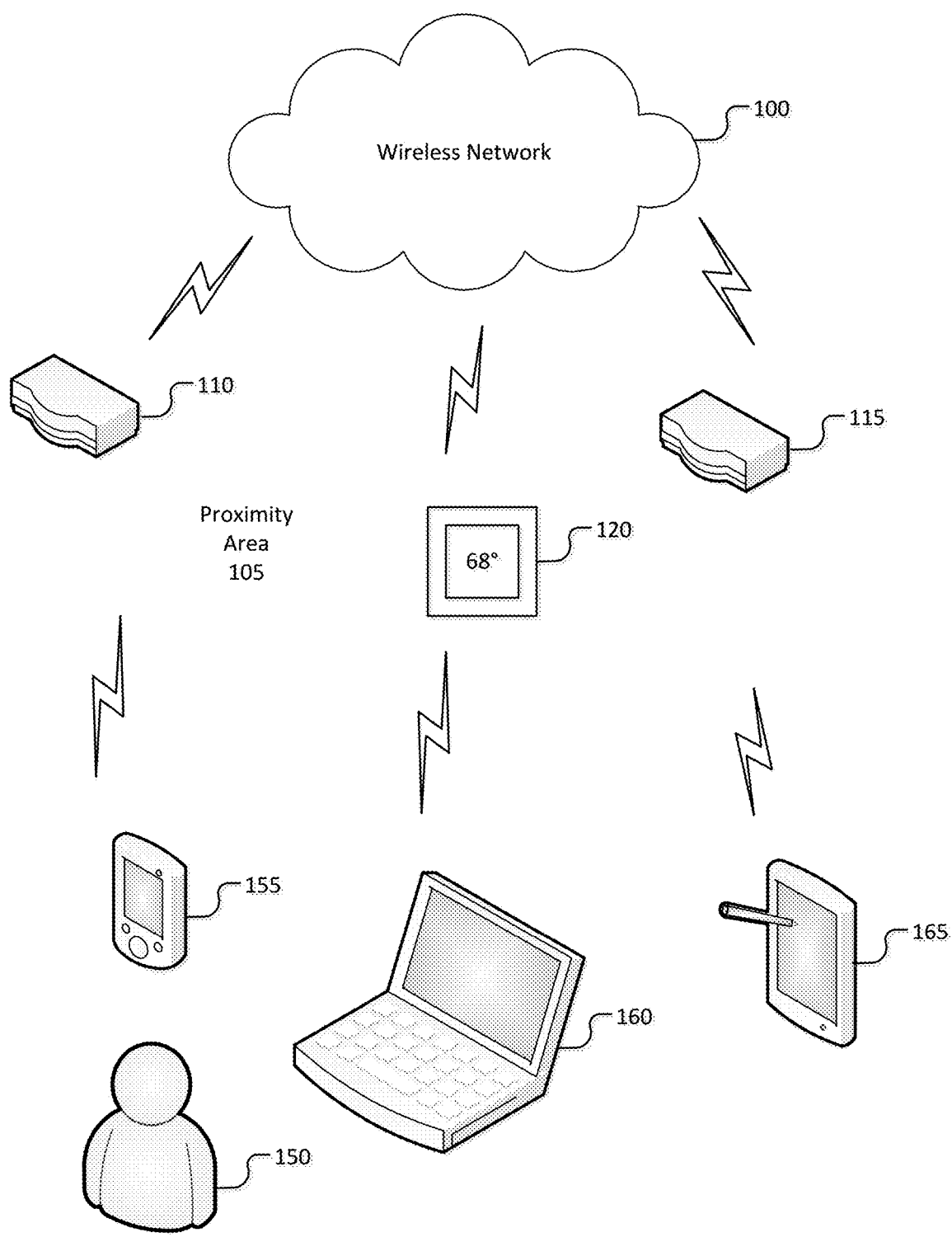
FIG. 1 is an illustration of an environmental data sharing network according to an embodiment.

Embodiments described herein are generally directed to sharing of environmental data for client device usage.

For the purposes of this description, the following apply:

"Mobile device" or "mobile electronic device" refers to a smartphone, smartwatch, tablet computer, notebook or laptop computer, handheld computer, mobile Internet device, wearable technology, or other mobile apparatus that includes processing ability and communication ability.

"Physical space" refers to any space or sub-space within or outside of a physical structure.

"System on chip" or "SoC" refers to a chip or integrated circuit (IC) that includes all components of a system, including, for example, all components of a computer.

"Environmental sensor" refers to a mechanism to sense or detect conditions, events, or changes in an environment and to produce a resulting output, wherein the output may be referred to as sensor data, sensing data, or similar terms. The output of a sensor may include, but is not limited to, electrical and optical signals. Conditions, events, and changes in an environment may include, but are limited to, temperature, humidity, barometric pressure, altitude, light (luminosity), and sound.

In some embodiments, an apparatus, system, and process provide for sharing environmental data for client device usage. In some embodiments, the environmental data may be shared according to an environmental data sharing protocol, wherein the protocol enables casual transmission and reception of environmental data for client devices within a proximity area. In some embodiments, environmental data may be shared for client device management. In one example, the environmental data includes ambient temperature data, wherein the ambient temperature data may be utilized to modify one or more threshold values in the operation of a client device operating in the proximity area. In some embodiments, environmental data may be shared for application in client device operations, for example for use in security monitoring and other purposes.

In the operation of mobile devices, particularly with regard to modern devices providing both a thin form factor and high performance operation, there is a need to monitor and address thermal overload conditions. In particular, the skin temperature (or cover/chassis temperature) of a mobile device can have a significant impact on the comfort and overall user experience of a user of the mobile device. Excessive heat will cause a mobile device to be uncomfortable to utilize, even if the internal temperature is not sufficient does not endanger the operation or lifespan of internal components, i.e., the thermal limit is a soft thermal limit.

However, the effect of the skin temperature of a mobile device on user experience is closely tied with the ambient temperature, with an increased ambient temperature resulting creating a circumstance in which the user is generally more tolerant of a higher skin temperature than in lower ambient temperatures because it is the difference between the ambient temperature and the skin temperature that the user is most sensitive to.

In a mobile device, it may generally be assumed that a value of 15 to 20° C. above the ambient temperature can be tolerated by a user. However, the actual value that is chosen may vary with other factors including the cover material, as, for example, metal conducts heat more efficiently than plastic and thus a temperature difference is felt more quickly with a metal cover than a plastic cover. Commonly a temperature threshold or limit beyond which a skin temperature will not be allowed is established for a mobile device, with the device instituting power control measures to reduce heat output if the threshold is exceeded.

Designers and manufacturers of mobile devices typically assume a particular ambient temperature, for example a 25° C. ambient temperature, when defining the target temperature threshold or limit for the chassis/skin of a particular mobile device. Based on this ambient temperature of 25° C., a tolerable temperature for a particular metal device chassis may be 20 degrees higher, or 45° C., which is then established as the threshold for the mobile device.

However, the tolerable temperature is based on an assumed ambient temperature that often will not be correct as the mobile device is carried into different environments with differing temperatures. If, for example, a 20 degree difference is tolerable, then at a 35° C. ambient temperature, a tolerable temperature limit of the same metal chassis would then be 55° C. Thus, the assumption of a 25° C. ambient temperature creates a circumstance in which the skin temperature may be overly controlled at higher ambient temperatures, and thus is resulting in reduced performance by the mobile device. In contrast, a thermal padding is very noticeable at a lower ambient temperature, and the assumption of a 25° C. ambient temperature may result in a mobile device feeling overly warm if the threshold temperature is reached.

For this reason, a more effective threshold would be based on a true ambient temperature. However, a mobile device commonly does not have a means to reliably know the current ambient temperature in the location, and thus the thermal management implementation for the mobile device cannot adjust threshold values accordingly.

In any particular environment, there are commonly many different mobile and stationary client devices being operated by different users, or operating independently in the case of Internet of Things (IoT) connected devices. Each such client device may potentially include environmental sensors capable of generating environmental data. However, accessing such data is difficult as the data is commonly held separately by each relevant device, thus requiring significant effort to request and receive environmental data if such service is available. In certain conventional apparatuses and systems data may be broadcast and shared via, for example, Bluetooth™ utilizing the iBeacon function. However, this implementation requires special devices that are manufactured for the specified purpose. For this reason, such apparatuses and systems are not economical or practical for general consumer usage in which a mobile device requires environmental data in varying locations.

In some embodiments, a client device is operable to share environmental data through implementation of an environmental data sharing protocol in a wireless network, the protocol enabling casual transmission and reception of environment data that may be utilized in mobile device operation. In some embodiments, a client device is operable to utilize received environmental data in the internal management of such device or system.

In some embodiments, implementation of an environment data sharing protocol may utilize, for example, Internet of Things (IoT) access. In some embodiments, a standard is defined to provide a standard based protocol that various IoT devices may implement to enable the sharing of environmental data, wherein the environmental data may then be used for internal management of a mobile device. In some embodiments, IoT devices within a certain proximity to each other (i.e., the devices are located within a certain proximity area) are operable to broadcast environmental data, for example the ambient temperature, through the standard based protocol that could then be used by the client computing device to adjust the thresholds for the skin temperature.

In some embodiments, an environmental data protocol is defined, wherein the protocol may be a standard or may be vendor defined protocol, the protocol to expose environmental data that is available to, for example, an "Internet enabled" room thermostat, IoT device, WiFi Router or access point, or other connected client device, for any other client device to consume. The environmental data that is exposed for device consumption may include any value relating to the local environment, and more specifically may include temperature, humidity, atmospheric pressure, light, sound, altitude, and other measures of the local environment.

In one embodiment, a client device utilizing an environmental data protocol may implement the "Beacon Frame Packet" used by wireless devices as environmental data frames. Beacon frames are commonly used to broadcast SSID (Service Set Identifier) and other identification information to client devices for device discovery. The beacon frames typically include a facility to expose vendor specific information encoded into the packet data. In an embodiment, environmental data is inserted into the beacon frame data structure format such that the beacon frame operates as an environmental data frame.

In some embodiments, temperature data or other environment data can be encoded in the beacon frame packet either under a Vendor Specific Tag or as a new Tagged Parameter for client computing devices to use in thermal management algorithms and policy.

In an alternative embodiment, the sharing of environmental data is provided by augmenting a device inquiry mechanism in a short distance wireless system. The wireless technology may be, for example, Bluetooth, which enables the exchanging over short distances. In some embodiments, the applicable wireless protocol is augmented to further include the exchange of environmental data in wireless data advertising without requiring the pairing, bonding, or other relationship of client devices. In this manner any client devices utilizing Bluetooth under the augmented protocol may be capable of providing and receiving environmental data without requiring authentication or handshaking between devises and without exposing any other data of the Bluetooth enabled device.

A significant benefit of an embodiment of an environmental data sharing apparatus, system, or process is that a client device requiring access to environmental data is not required to pair or connect to the provider of the environmental data in order to obtain the required information. Rather, the client device is able to obtain environmental data through casual transmission and reception of environmental data.

FIG. 1 is an illustration of an environmental data sharing network according to an embodiment. In some embodiments, a wireless network 100, wherein the wireless network may include Internet of Things, a short distance wireless network, or other similar wireless network technology, provides communication between multiple client devices for the sharing of environmental data according to an environment sharing protocol. In such operation, there is at least one physical area referred to a proximity area 105, wherein the proximity area may be any area that is close enough in distance in order for shared environmental data to be of use in for a receiving device.

In some embodiments, the client devices operating according to the protocol may include one or more mobile devices utilized by a user 150, wherein the mobile devices are illustrated in FIG. 1 as a smartphone 155, a notebook computer 160, and a tablet computer 165. In the wireless network 100 there may also be one or more stationary devices, wherein the stationary devices are illustrated as a IoT or other network connected thermostat 120, wherein the thermostat 120 includes both the capability of sensing one or more environmental conditions, and in particular temperature, and the capability of sharing environmental data wirelessly.

In some embodiments, communication through one or more network routers 110 and 115, for example WiFi routers, to provide connection with IoT, or direct peer to peer communication between devices. In some implementations, the thermal and other environment data may be provided from the WiFi router. Such a device is centrally located, and could either include environmental sensors or could receive and provide and expose the data received from one or more devices including such sensors.

Figure 2:
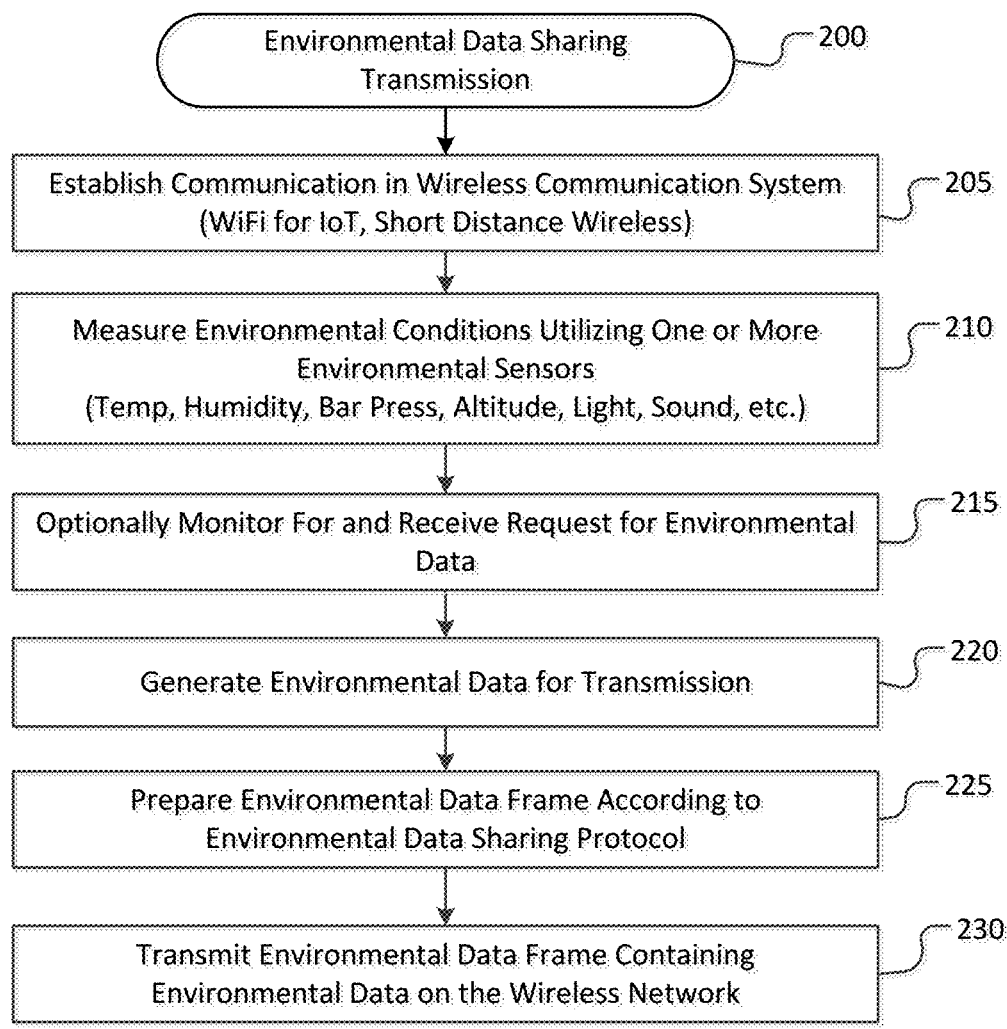
FIG. 2 is a flowchart to illustrate a process for environmental data sharing transmission according to an embodiment.

FIG. 2 is a flowchart to illustrate a process for environmental data sharing transmission according to an embodiment. In some embodiments, a process for environmental data sharing transmission 200 includes the following:

205: Establishing communication by a stationary or mobile client device in a wireless network. The wireless network may include connecting via WiFi, cellular, or other means to the Internet for IoT operation; operating to provide data in a short distance wireless system, for example Bluetooth; or other wireless network in which an environmental data sharing protocol is implemented.

210: Measuring environmental conditions by the client device utilizing one or more environmental sensors. The sensors may include sensing temperature, humidity, barometric pressure, altitude, light, sound, altitude, or other environmental condition. In a particular example, an environmental sensor measures ambient temperature.

215: Monitor for and receive request for environmental data. In some embodiments, the client device may optionally monitor for requests for environmental data received according to the environmental data sharing protocol, wherein the request may request particular environmental data within a specified proximity area. In other embodiments, the client device may provide environmental data without requesting, for example transmitting such environmental data periodically.

220: Generating environmental data for transmission, wherein generating environmental data may include providing a sample value (for example a temperature at a certain time), generating an average value over a certain period of time (for example an average temperature), providing value extremes (for example a maximum temperature and a minimum temperature over a certain period of time), or other known data form.

225: Preparing environmental data frame according to the environmental data sharing protocol. The preparation of the data frame may include use of an existing frame that is augmented for environmental data sharing according to the protocol. The data frame may include additional information according to the protocol, for example a time value and a location value for the environmental data.

230: Transmitting the prepared environmental data frame containing the environmental data.

Figure 3:
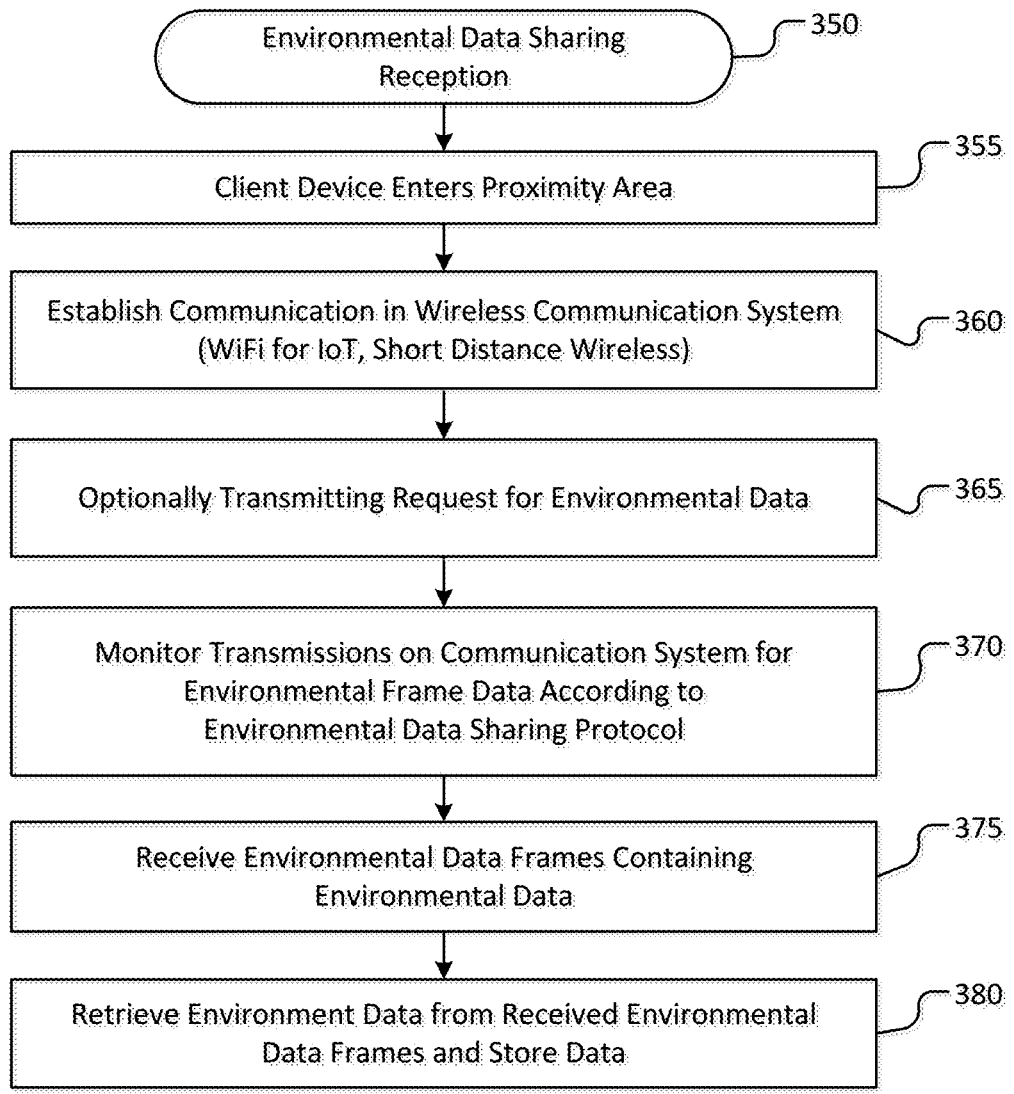
FIG. 3 is a flowchart to illustrate a process for environmental data sharing reception according to an embodiment.

FIG. 3 is a flowchart to illustrate a process for environmental data sharing reception according to an embodiment. In some embodiments, a process for environmental data sharing reception 350 includes the following:

355: A client device, for example a mobile device, enters a particular physical location, the physical location being within a proximity area for purposes of an environmental data sharing protocol.

360: Establishing communication by the client device in a wireless network according to the environmental data sharing protocol. The wireless network may include connecting via WiFi, cellular, or other means to the Internet for IoT operation; operating to provide data in a short distance wireless system, for example Bluetooth; or other wireless network in which an environmental data sharing protocol is implemented.

365: Transmit request for environmental data. Optionally an environmental data sharing protocol may provide for transmission for a request for environmental data by a client device, wherein the request may include specification of environmental data needed and identification of a proximity area for which the client device requires environmental data.

370: Monitoring transmissions on the wireless network for environmental frame data by the client device pursuant to the environmental data sharing protocol.

375: Receiving environmental data frames containing certain environmental data by the client device.

380: Retrieving environmental data from the received environmental data frames, and utilizing such data or storing the data for later use. The environmental data may include data regarding temperature, humidity, barometric pressure, altitude, light, sound, or other environmental condition. In a particular example, an environmental data is ambient temperature.

Figure 4:
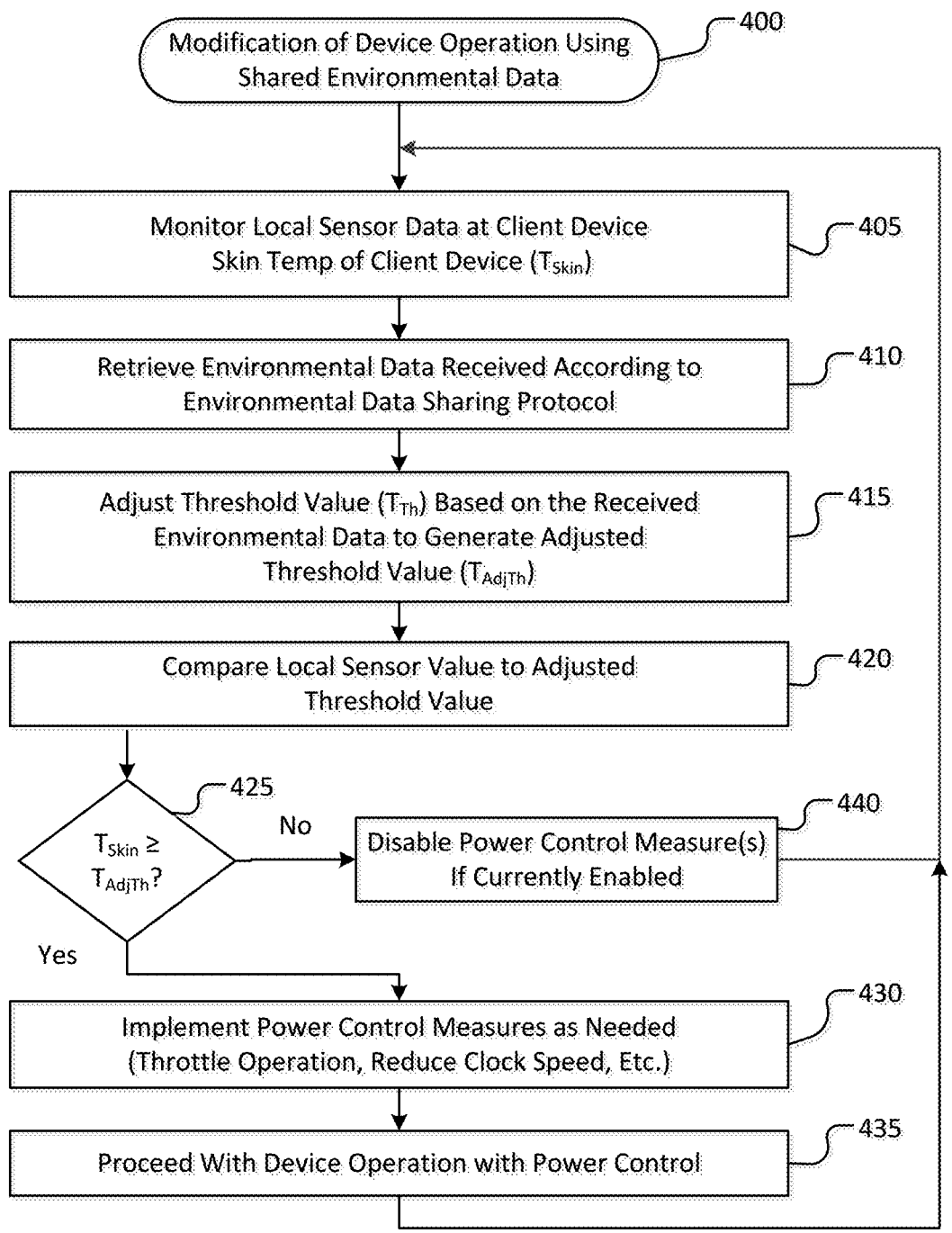
FIG. 4 is a flowchart to illustrate a process for modification of device information used shared environmental data according to an embodiment.

In some embodiments, the received environmental data is utilized for internal management of the client device, for example the receipt of data may include receipt of ambient temperature data, the ambient temperature being utilized to modify one or more threshold values to maintain operation of the mobile device as illustrated in FIG. 4.

However, embodiments are not limited to this particular usage of ambient temperature data, and such data be applied for other purposes. In an example, ambient temperature may be used for an Internet connected smart device to monitor temperatures from nearby sources to identify dangerous or unusual conditions in a security system. In one implementation a home gateway device may monitor ambient temperature from various IoT security cameras or motion sensor devices to monitor for fire events, freezing events, open doors or windows, or other similar conditions, and to then notify owners or public services accordingly.

In another example, public authorities may utilize available environmental data for public service purposes, including public utility monitoring and public safety.

FIG. 4 is a flowchart to illustrate a process for modification of device information used shared environmental data according to an embodiment. In some embodiments, a process for device operation using shared environmental data 400 includes the following:

405: Monitoring local sensor data in a client device, for example a mobile device, wherein the data may include a skin temperature of the client device, the skin temperature being designated as $T_{Skin}$.

410: Retrieving shared environmental data received according to an environmental data sharing protocol, for example as illustrated in FIG. 3. The shared environmental data may include data regarding temperature, humidity, barometric pressure, altitude, light, sound, or other environmental condition. In a particular example, an environmental data is ambient temperature.

415: Adjust one or more threshold values ($T_{Th}$) for the client device based on the received environmental data to generate an adjusted threshold value. For a temperature, the adjusted threshold temperature ($T_{AdjTh}$). In some embodiments, more than one type of environmental may be utilized in adjusting a threshold value, and, in this particular example, another environmental data value that may be utilized to adjust the threshold temperature is altitude.

420: Compare the local sensor value to the adjusted threshold value, for example comparing a local temperature sensor value measuring skin temperature to the adjusted threshold temperature value.

425: In the example of skin temperature for the client device, determine if the skin temperature is greater than the adjusted threshold temperature ($T_{Skin} > T_{AdjTh}$).

430: In the example of skin temperature comparison, upon determining that the skin temperature is greater than the adjusted temperature threshold, implementing power control measures as needed to reduce the skin temperature to no more than the adjusted threshold temperature value. The power control measures may include throttling operation of the client device, reducing clock speed, or any other known method of reducing power consumption of a client device.

435: The client device then continues operation with the one or more power controls in place to reduce the skin temperature of the client device, and continue with monitoring the local sensor value 405.

440: In the example of skin temperature comparison, upon determining that the skin temperature is less than the adjusted temperature threshold, and thus the skin temperature is not excessively warm for the current ambient temperature, the client device may disable power control measures if currently enabled, and continue with monitoring the local sensor value 405.

Figure 5:
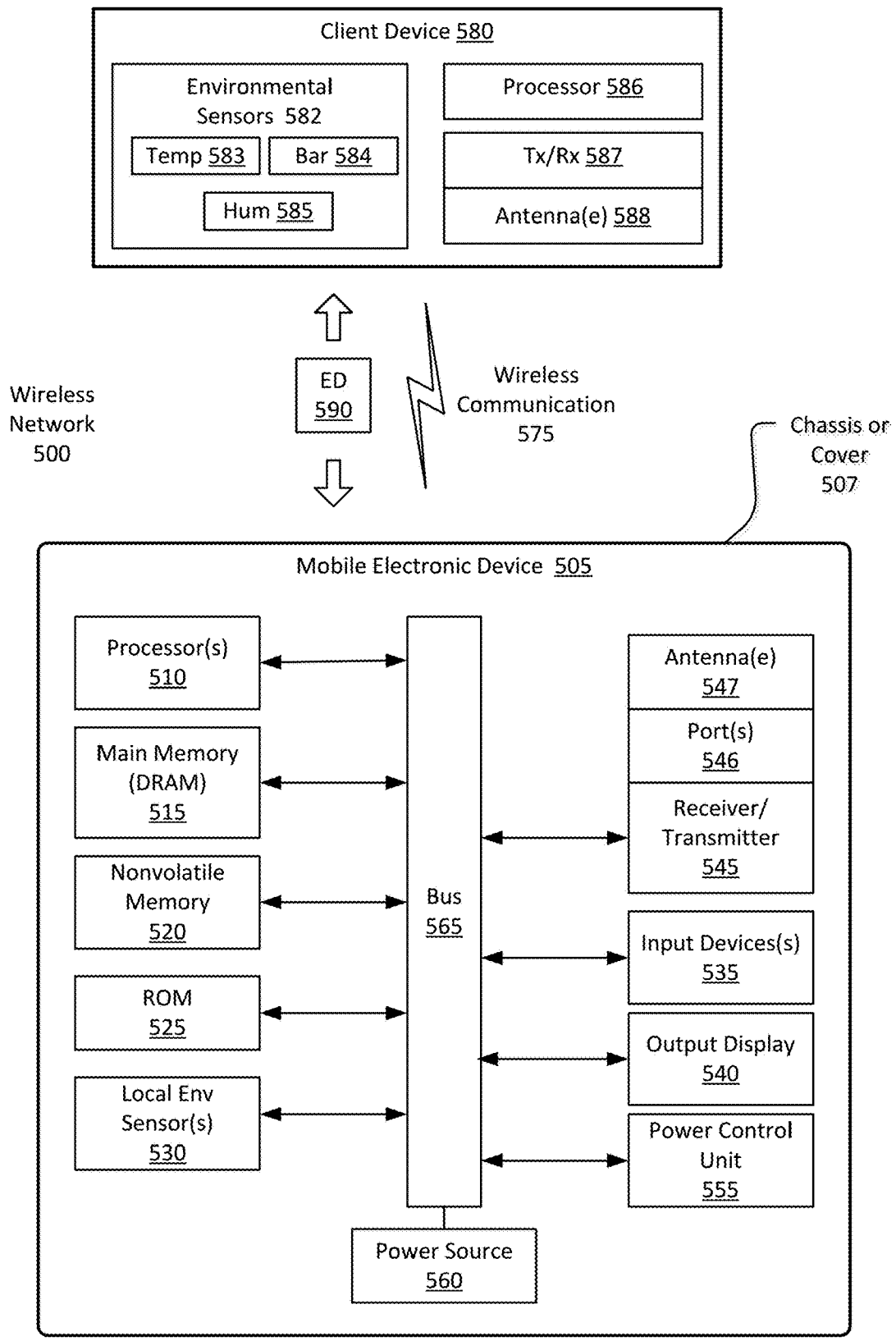
FIG. 5 is an illustration of electronic devices operable to provide for sharing of environmental data in a wireless network.

FIG. 5 is an illustration of client devices operable to provide for sharing of environmental data in a wireless network. In this illustration, certain standard and well-known components that are not germane to the present description are not shown. Elements shown as separate elements may be combined, including, for example, an SoC (System on Chip) combining multiple elements on a single chip.

In some embodiments, a wireless network 500 enables communication or data transfer between multiple client devices, including sharing of environment data between the devices in a particular proximity area according to an environmental data sharing protocol. In this example the devices may include a mobile device 505 and a second client device 580 that may be, for example an IoT device. However embodiments are not limited to the illustrated example, and may include other and different devices and systems.

In some embodiments, there is a direct or indirect wireless communication 575 between the client devices in the wireless network for the sharing of environmental data between the client devices according to the environmental data sharing protocol. In some embodiments, the transfer of data is in the form of environmental data frames 590 or other data format according to the environmental data sharing protocol. While in the particular example illustrated in FIG. 5 the environmental data is provided by the second client device 580 and received by mobile device 505, embodiments are limited to this particular implementation, and may include transmission, reception, or both of environmental data between any of the devices and systems in a proximity area. In some embodiments, the environmental data sharing protocol may further provide for transmission and reception of requests for environmental data.

In some embodiments, the mobile device 505 includes a processing means, for example one or more processors 510, coupled to one or more buses or interconnects, shown in general as bus 565. The processors 510 may comprise one or more physical processors and one or more logical processors. In some embodiments, the processors may include one or more general-purpose processors or special-processor processors.

The bus 565 is a communication means for transmission of data. The bus 565 is illustrated as a single bus for simplicity, but may represent multiple different interconnects or buses and the component connections to such interconnects or buses may vary. The bus 565 shown in FIG. 5 is an abstraction that represents any one or more separate physical buses, point-to-point connections, or both connected by appropriate bridges, adapters, or controllers.

In some embodiments, the mobile device 505 further comprises a random access memory (RAM) or other dynamic storage device or element as a main memory 515 for storing information and instructions to be executed by the processors 510. Main memory 515 may include, but is not limited to, dynamic random access memory (DRAM). The mobile device 505 also may comprise a non-volatile memory 520 for storage of date when no power is applied, which may include flash memory or other technology to store data. Storage in the main memory or non-volatile memory 520 may include received shared environmental data. The mobile device 505 may further include a read only memory (ROM) 525 or other static storage device for storing static information and instructions for the processors 510.

In some embodiments, the mobile device 505 includes one or more local environmental sensors 530 to generate sensor data regarding environmental conditions, for example a skin temperature of the mobile device 505. In some embodiments, the mobile device includes a chassis or cover 507, the skin temperature representing temperature for the chassis or cover 507. In some embodiments, an application of the sensor data is modified based at least in part on the shared environmental data received from the client device 580.

In some embodiments, the mobile device 505 includes one or more transmitters or receivers 545 coupled to the bus 565. In some embodiments, the mobile device 505 may include one or more antennae 547, for example dipole or monopole antennae, for the transmission and reception of data via wireless communication using a wireless transmitter, receiver, or both, and one or more ports 546 for the transmission and reception of data via the wireless network 500. Wireless communication includes, but is not limited to, Wi-Fi, Bluetooth™, near field communication, and other wireless communication standards. The wireless communication may include transmission, reception, or both of shared environmental data according to the environmental data sharing protocol.

In some embodiments, the mobile device 505 includes one or more input devices 535 for the input of data, including hard and soft buttons, a joy stick, a mouse or other pointing device, a keyboard, voice command system, or gesture recognition system. In some embodiments, the mobile device 505 includes an output display 540, where the output display 540 may include a liquid crystal display (LCD) or any other display technology, for displaying information or content to a user. In some environments, the output display 540 is a touch-screen that is also utilized as at least a part of an input device 535. Output display 540 may further include audio output, including one or more speakers, audio output jacks (if present for the mobile device), or other audio, and other output to the user.

In some embodiments, the mobile device 505 includes a power control unit 555 to control the consumption of power in the mobile device. In addition to other usages of shared environmental data, data that is shared according to the environmental data sharing protocol may be utilized to modify the control of power consumption. In a particular example, received shared environmental data providing ambient temperature is utilized to modify one or more temperature thresholds, which are then utilized to evaluate skin temperature of the mobile device.

The mobile device 505 may also comprise a battery or other power source 560, which may include a solar cell, a fuel cell, a charged capacitor, near field inductive coupling, or other system or device for providing or generating power in the mobile device 505. The power provided by the power source 560 may be distributed as required to elements of the mobile device 505.

In some embodiments, the second client device 580 may include one or more environmental sensors 582, which may include a temperature sensor 583, a barometric pressure sensor 584, a humidity sensor 585, or other environmental data sensor. In some embodiments, the client device further includes a processor or controller 586 for control of operation of the client device 580, a transmitter, receiver, or both 587 for the transmission and reception of data, and one or more antennae for transmission or reception of data 588. In one particular example, the client device 580 may include a device, for example a thermostat, that measures environmental data utilizing the environmental sensors 582, and operates to transmit the environmental data according to the environmental data sharing protocol. However, embodiments are not limited to this type of client device, and may include other stationary or mobile devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a client device includes a processor; an environmental sensor to sense an environmental condition, an output of the environmental sensor being a local environmental sensor value; and a wireless receiver to receive environmental data for a certain proximity area from a second client device according to an environmental data sharing protocol via a wireless network, wherein the environmental data sharing protocol allows receipt of the environmental data without requiring pairing, bonding, or other relationship of client devices.

In some embodiments, the wireless network includes one of wireless communication to access the Internet or a short distance wireless communication system. In some embodiments, the second client device is an Internet of Things (IoT) device. In some embodiments, the wireless network includes Bluetooth™.

In some embodiments, the received environmental data includes one or more of temperature, humidity, barometric pressure, altitude, light, and sound. In some embodiments, the received environmental data includes ambient temperature.

In some embodiments, the client device is to apply the received environment data for client device management.

In some embodiments, the client device is to adjust a threshold value for the local environmental sensor value based on the received environmental data, and to apply the adjusted threshold data in operation of the client device.

In some embodiments, the environmental condition is a skin temperature of the client device and the threshold value is a threshold temperature for the skin temperature.

In some embodiments, the client device further includes a power control unit, the power control unit to enable or disable one or more power control measures based on a comparison between the skin temperature and the adjusted threshold temperature.

In some embodiments, one or more non-transitory computer-readable storage mediums having stored thereon data representing sequences of instructions that, when executed by one or more processors, cause the one or more processors to perform operations including establishing communication at a client device in a wireless network; measuring environmental conditions with one or more environmental sensors of the client device to generate sensor signals; generating environmental data for transmission based on the sensor signals; preparing an environmental data frame according to an environmental data sharing protocol and inserting the environmental data into the data frame; and transmitting the environmental data frame by the client device on the wireless network, wherein the environmental data sharing protocol allows transmission of the environmental data without requiring pairing, bonding, or other relationship of client devices.

In some embodiments, the wireless network includes one or wireless communication to access the Internet or a short distance wireless communication system. In some embodiments, the client device is an Internet of Things (IoT) device.

In some embodiments, the wireless network includes Bluetooth™.

In some embodiments, the environmental data includes one or more of temperature, humidity, barometric pressure, altitude, light, and sound data. In some embodiments, the environmental data includes ambient temperature.

In some embodiments, the instruction further include monitoring for a request for environmental data on the wireless network, wherein preparation of environmental data for transmission is performed in response to a received request for environmental data.

In some embodiments, one or more non-transitory computer-readable storage mediums having stored thereon data representing sequences of instructions that, when executed by one or more processors, cause the one or more processors to perform operations including establishing communication at a client device in a wireless network; measuring a local environmental sensor value with an environmental sensor; monitoring for shared environmental data according to an environmental data sharing protocol; receiving an environmental data frame from a second client device, the environmental data frame containing environmental data according to the environmental data sharing protocol; and retrieving the environmental data from the received environmental data frame, wherein the environmental data sharing protocol allows receipt of the environmental data without requiring pairing, bonding, or other relationship of client devices.

In some embodiments, the wireless network includes one of wireless communication to access the Internet or a short distance wireless communication system.

In some embodiments, the received environmental data includes one or more of temperature, humidity, barometric pressure, altitude, light, and sound data. In some embodiments, the received environmental data includes ambient temperature.

In some embodiments, the instructions further include applying the received environment data for client device management. In some embodiments, the instructions further include adjusting a threshold value for the local environmental sensor value based on the received environmental data. In some embodiments, the environmental condition is a skin temperature of the client device and the threshold value is a threshold temperature for the skin temperature, and the instructions further include enabling or disabling one or more power control measures for the client device based on a comparison between the local environmental sensor value and the adjusted threshold temperature.

In some embodiments, the instructions further include preparing a request for environmental data and transmitting the request on the wireless network.

In some embodiments, an apparatus includes means for establishing communication at a client device in a wireless network; means for measuring environmental conditions with one or more environmental sensors of the client device to generate sensor signals; means for generating environmental data for transmission based on the sensor signals; means for preparing an environmental data frame according to an environmental data sharing protocol and inserting the environmental data into the data frame; and means for transmitting the environmental data frame by the client device on the wireless network, wherein the environmental data sharing protocol allows transmission of the environmental data without requiring pairing, bonding, or other relationship of client devices.

In some embodiments, the wireless network includes one or wireless communication to access the Internet or a short distance wireless communication system. In some embodiments, the client device is an Internet of Things (IoT) device. In some embodiments, the wireless network includes Bluetooth™.

In some embodiments, the environmental data includes one or more of temperature, humidity, barometric pressure, altitude, light, and sound data. In some embodiments, the environmental data includes ambient temperature.

In some embodiments, the apparatus further includes means for monitoring for a request for environmental data on the wireless network, wherein preparation of environmental data for transmission is performed in response to a received request for environmental data.

In some embodiments, an apparatus includes means for establishing communication at a client device in a wireless network; means for measuring a local environmental sensor value with an environmental sensor; means for monitoring for shared environmental data according to an environmental data sharing protocol; means for receiving an environmental data frame from a second client device, the environmental data frame containing environmental data according to the environmental data sharing protocol; and means for retrieving the environmental data from the received environmental data frame, wherein the environmental data sharing protocol allows receipt of the environmental data without requiring pairing, bonding, or other relationship of client devices.

In some embodiments, the wireless network includes one of wireless communication to access the Internet or a short distance wireless communication system.

In some embodiments, the received environmental data includes one or more of temperature, humidity, barometric pressure, altitude, light, and sound data. In some embodiments, the received environmental data includes ambient temperature.

In some embodiments, the apparatus further includes means for applying the received environment data for client device management. In some embodiments, the apparatus further includes means for adjusting a threshold value for the local environmental sensor value based on the received environmental data. In some embodiments, the environmental condition is a skin temperature of the client device and the threshold value is a threshold temperature for the skin temperature, the apparatus further includes means for enabling or disabling one or more power control measures for the client device based on a comparison between the local environmental sensor value and the adjusted threshold temperature.

In some embodiments, the apparatus further includes means for preparing a request for environmental data and transmitting the request on the wireless network.

What is claimed is:

1. A client device comprising:
   a processor;
   an environmental sensor to sense an environmental condition, an output of the environmental sensor being a local environmental sensor value; and
   a wireless receiver to receive environmental data including an ambient temperature and one or more of humidity, barometric pressure, altitude, light, and sound for a certain proximity area from a second client device according to an environmental data sharing protocol via a wireless network;
   wherein the environmental data sharing protocol allows receipt of the environmental data without requiring pairing, bonding, or other relationship of client devices, wherein the environmental data are inserted into a beacon frame to operate as an environmental data frame to broadcast the environmental data to the client devices, wherein the client device is to apply the received environmental data for client device management, wherein the client device is to adjust a threshold value for the local environmental sensor value based on the received environmental data, and to apply the adjusted threshold value in operation of the client device, wherein the environmental condition includes a skin temperature of the client device and the threshold value is a threshold temperature for the skin temperature.

2. The client device of claim 1, wherein the wireless network includes one of wireless communication to access an Internet or a short distance wireless communication system.

3. The client device of claim 2, wherein the second client device is an Internet of Things (IoT) device.

4. The client device of claim 2, wherein the wireless network includes Bluetooth™.

5. The client device of claim 1, further comprising a power control unit, the power control unit to enable or disable one or more power control measures based on a comparison between the skin temperature and the adjusted threshold temperature.

6. One or more non-transitory computer-readable storage mediums having stored thereon data representing sequences of instructions that, when executed by one or more processors, cause the one or more processors to perform operations comprising:
   establishing communication at a client device in a wireless network;
   measuring environmental conditions with one or more environmental sensors of the client device to generate sensor signals;
   generating environmental data for transmission based on the sensor signals;
   preparing an environmental data frame according to an environmental data sharing protocol and inserting the environmental data into the data frame, wherein the environmental data are inserted into a beacon frame to operate as the environmental data frame to broadcast the environmental data to client devices; and
   transmitting the environmental data frame by the client device on the wireless network;
   wherein the environmental data sharing protocol allows transmission of the environmental data including an ambient temperature and one or more of humidity, barometric pressure, altitude, light, and sound without requiring pairing, bonding, or other relationship of the client devices, wherein the environmental data are transmitted for other client device management, wherein the environmental data are transmitted to adjust a threshold value for a skin temperature of the other client device, and to apply the adjusted threshold value in operation of the other client device.

7. The medium of claim 6, wherein the wireless network includes a wireless communication to access an Internet or a short distance wireless communication system.

8. The medium of claim 7, wherein the client device is an Internet of Things (IoT) device.

9. The medium of claim 7, wherein the wireless network includes Bluetooth™.

10. The medium of claim 6, further comprising instructions that, when executed by the one or more processors, cause the one or more processors to perform operations comprising:
    monitoring for a request for environmental data on the wireless network, wherein preparation of environmental data for transmission is performed in response to a received request for environmental data.

11. One or more non-transitory computer-readable storage mediums having stored thereon data representing sequences of instructions that, when executed by one or more processors, cause the one or more processors to perform operations comprising:
    establishing communication at a client device in a wireless network;
    measuring a local environmental sensor value with an environmental sensor;
    monitoring for shared environmental data according to an environmental data sharing protocol;
    receiving an environmental data frame from a second client device, the environmental data frame containing environmental data according to the environmental data sharing protocol, wherein the environmental data are inserted into a beacon frame to operate as the environmental data frame to broadcast the environmental data to client devices; and
    retrieving the environmental data from the received environmental data frame;
    wherein the environmental data sharing protocol allows receipt of the environmental data that include an ambient temperature and one or more of humidity, barometric pressure, altitude, light, and sound without requiring pairing, bonding, or other relationship of the client devices;
    applying the received environmental data for client device management;

adjusting a threshold value for the local environmental sensor value based on the received environmental data, wherein the environmental condition includes a skin temperature of the client device and the threshold value is a threshold temperature for the skin temperature.

12. The medium of claim 11, wherein the wireless network includes a wireless communication to access an internet or a short distance wireless communication system.

13. The medium of claim 11,
further comprising instructions that, when executed by the one or more processors, cause the one or more processors to perform operations comprising:
enabling or disabling one or more power control measures for the client device based on a comparison between the local environmental sensor value and the adjusted threshold temperature.

14. The medium of claim 11, further comprising instructions that, when executed by the one or more processors, cause the one or more processors to perform operations comprising:
preparing a request for environmental data and transmitting the request on the wireless network.

* * * * *